1

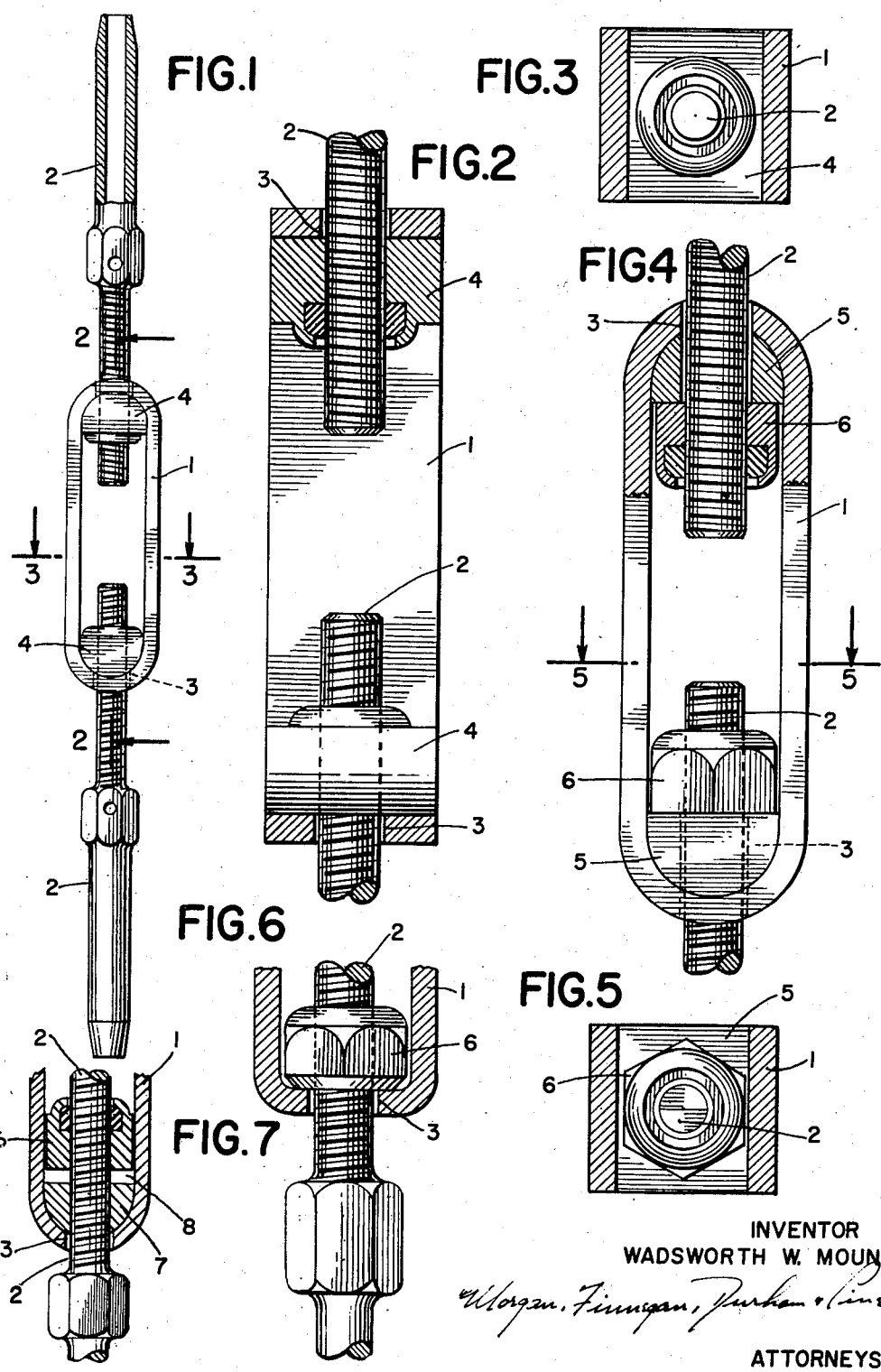

United States Patent Office 2,859,991
Patented Nov. 11, 1958

2,859,991

SELF-LOCKING TURNBUCKLE

Wadsworth W. Mount, Chatham, N. J.

Application April 4, 1956, Serial No. 576,166

3 Claims. (Cl. 287—60)

The present invention relates to a new type of turnbuckle which is self-locking. Such turnbuckles are well adapted to aircraft fittings, aircraft control cables, marine fittings and for various commercial purposes.

One of the major problems in the design and manufacture of turnbuckles has been to devise means for locking the turnbuckle in its fixed position and to secure it in such position from movement due to repeated torsion, vibration or similar forces. To this end, various locking expedients have been used, such as locking wires, wing nuts, cotter pins, tongued lock washers, friction jam nuts, clamps, and other more complicated means.

Each of these attempted solutions includes the use of an additional element in the structure, or the performance of one or more extra operations in manufacture and use.

Objects and advantages of the invention will be set forth in part hereinafter and in part will be obvious therefrom, or may be learned by practice with the invention, the same being realized and attained by means of the combinations, improvements and instrumentalities pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

It is an object of the present invention to provide an improved turnbuckle which is self-locking and which has a minimum of components.

A further object is to provide such a turnbuckle which can be economically assembled from readily available standard stock and parts.

Another object is to provide such a turnbuckle which will have a minimum weight to strength ratio.

Another object is to provide such a turnbuckle whose main section can be cheaply manufactured from sections of tubing which have been cut off transversely.

Another object is to provide such a turnbuckle adapted to be used so as to provide an early warning of excessive stress in cable tension.

Still another objection is to provide such a turnbuckle which can be readily and economically modified in its construction to perform in an optimum manner for various specific applications.

The turnbuckles of this invention may be made with a single take-up member with a connecting member at the other end, or may be made with take-up members at both ends.

Of the drawings:

Figure 1 is a view in elevation of an embodiment of this invention;

Figure 2 is a fragmentary view, partially in section, taken along the line 2—2 of Figure 1;

Figure 3 is a view taken along the line 3—3 of Figure 1;

Figure 4 is a fragmentary view, partially in section, of another embodiment of the invention;

Figure 5 is a view taken along the line 5—5 of Figure 4;

Figure 6 is a fragmentary view of still another embodiment of the invention; and Figure 7 illustrates a modification to provide an early warning of excessive stress.

Referring now in detail to the accompanying drawings, Figures 1, 2 and 3 show a turnbuckle body 1, having take-up members 2 passing into it at either end through holes 3. Threaded on each take-up member 2 is a self-locking nut 4. These particular nuts are barrel type elastic stop nuts.

It is apparent in this construction that when the body 1 is turned to bring the take-up members 2 to the point of maximum tension the nuts 4 will exert their self-locking action on the take-up members 2, and the parallel sides of the body 1, bearing against the flat sides of the nuts 4, will prevent the take-up members 2 from turning with relation to the body 1. The curved portions of the nuts 4 bear against the curved end portions of the body 1, thus effectively distributing the tensile load.

In the embodiment shown in Figures 4 and 5 of the drawings, a bearing member 5 is fitted over each of the take-up members 2. Next to each member 5 is threaded a self-locking nut 6. The particular nuts shown are hexagonal elastic stop nuts, although there are many other commercial types of self-locking nuts which can equally well be used.

The bearing members 5 may have untapped clearance holes as shown in Figures 4 and 5. In such a structure they are merely used to give a proper seat for the self-locking nuts 6 which hold the tensile load as well as lock the body 1 against rotation relative to the members 2 because of their self-locking action and the closeness of the flat sides of the nuts 6 to the inner faces of the body 1. Alternatively, as shown in Figure 7, the bearing members 7 may be tapped to receive the threads of the take-up members 2. In such case the bearing members 7 also hold the tensile load, while the self-locking nuts 6 hold the body 1 against relative rotation with the take-up members in the same manner as above described. Although this construction uses up more take-up room inside the body of the turnbuckle than does the use of barrel nuts alone, it does permit quicker take-up until the point of high tension is approached, when the lock nuts are put on and further rotation takes the threads just through the lock nuts.

In addition, as shown in Figure 7, if it is desired to use a turnbuckle as a cable connector which will yield to a certain degree under emergency load but which will not separate completely before the cable itself breaks, th threaded bearing members 7 may be made of a relatively soft material, like brass, designed so that their load-bearing threads will shear, preferably at a tensile stress just below the elastic limit of the steel cable, in which event the load will then be transferred to and carried by the threads in the stronger lock nuts 6 as they are pulled down against the bearing members 7. In this application a definite space 8 initially would be left between the tapped load-bearing members 7 and the self-locking emergency load bearing nuts 6. By this arrangement, a sudden slackening of the cable tension, in aircraft for instance, could warn of dangerous overloading of the control cable in time to guard against a more dangerous parting of the cable.

As shown in Figure 6, a hexagonal self-locking nut 6 may be used alone, without a bearing member, when the end of the body 1 is flattened to provide a suitable bearing surface for the nut 6, which both holds the tensile load and locks the turnbuckle against rotation as in the embodiment of Figure 5.

The self-locking nuts are, of course, commercially available. I have found that the body member of the turnbuckle may be conveniently made by slicing up stainless steel tubing to the desired width and then flattening the slices to the desired shape. For economical large-scale production the tubing to be used would be drawn directly in the approximately flattened-oval or rectangular cross section desired, as illustrated in the drawings.

Depending upon the purpose for which the turnbuckle is intended, it may be constructed as the double take-up type as shown in the drawings, or as the single take-up type with a take-up member at one end and a freely rotating headed member, such as a bolt, at the other. In the former case the take-up members and nuts, and bearing members when threaded, at opposite ends must be respectively oppositely threaded. In the latter case the take-up member and nut and bearing member when threaded may be conventionally, right handedly threaded.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. A turnbuckle comprising a body having a pair of side walls in spaced-apart opposing relation to each other, and a pair of end walls each connecting a pair of corresponding ends of said side walls; at least one threaded takeup member passing freely through one of said end walls into the space between said side walls, the end wall through which said takeup member passes having a curved bearing portion; a self-locking nut disposed in said space and threadedly engaging said takeup member; and, a similarly curved bearing member slidably positioned on such takeup member between said self-locking nut and said curved wall bearing portion, said nut being of a configuration and radial dimension to be confined against rotation by and between said side walls, and said nut under load from said takeup member serving to impart said load to said body.

2. A turnbuckle comprising a body having a pair of side walls in spaced-apart opposing relation to each other, and a pair of end walls each connecting a pair of corresponding ends of said side walls; at least one threaded take-up member passing freely through one of said end walls into the space between said side walls, the end wall through which said takeup member passes having a portion providing a bearing surface; a self-locking nut disposed in said space and threadedly engaging said takeup member; and, a threaded bearing member positioned on said takeup member between said bearing surface and said nut, said bearing member having a bearing surface similar to that of said end wall bearing portion, adapted to bear against said end wall bearing surface, said nut being of a configuration and radial dimension to be confined against rotation by and between said side walls and being normally spaced axially on said takeup member from said bearing member, and said bearing member having threads of lesser shearing strength under load from said takeup member, than those of said nut.

3. A turnbuckle as in claim 1, in which said side walls and nut have flat parallel faces, and the dimensions of each are such that, when assembled, said nut cannot rotate independently of said body, and in which said body is a severed section of a length of rigid metal tubing partly flattended to provide said parallel-faced side walls and curved end walls.

References Cited in the file of this patent

UNITED STATES PATENTS

| | | |
|---|---|---|
| 1,012,008 | Post | Dec. 19, 1911 |
| 1,505,508 | Trager | Aug. 19, 1924 |
| 1,820,216 | Ferris | Aug. 25, 1931 |
| 2,326,681 | Richardson | Aug. 10, 1943 |

FOREIGN PATENTS

| | | |
|---|---|---|
| 136,234 | Great Britain | Dec. 8, 1919 |